United States Patent [19]

Gravely

[11] Patent Number: 4,798,971
[45] Date of Patent: Jan. 17, 1989

[54] APPARATUS FOR CONTROLLING DEVICE START UP AND OFF/ON RUNNING PERIODS

[75] Inventor: Charles T. Gravely, Sachse, Tex.
[73] Assignee: J & S Electronics, Inc., Garland, Tex.
[21] Appl. No.: 38,041
[22] Filed: Apr. 14, 1987
[51] Int. Cl.⁴ .......................... H01H 7/00; G05F 3/04
[52] U.S. Cl. ...................................... 307/141; 246/10; 323/323; 361/196
[58] Field of Search ............... 323/323, 324, 235, 236, 323/319; 307/632, 643, 646, 117, 141; 110/192; 361/196; 246/10, 11, 46 R

[56] References Cited

U.S. PATENT DOCUMENTS

| | | | |
|---|---|---|---|
| 4,243,875 | 1/1981 | Chang | 219/497 |
| 4,348,583 | 9/1982 | Bube et al. | 219/497 |
| 4,394,957 | 7/1983 | Newton | 307/632 |
| 4,423,765 | 1/1984 | Hildebrand | 361/196 |
| 4,485,966 | 12/1984 | Cartmell et al. | 236/46 R |
| 4,509,585 | 4/1985 | Carney et al. | 236/46 R |
| 4,667,874 | 5/1987 | Johnson et al. | 236/10 |

Primary Examiner—William H. Beha, Jr.
Attorney, Agent, or Firm—Hubbard, Thurman, Turner & Tucker

[57] ABSTRACT

A forced air gas heating furnace system includes a thermostat having a transformer for converting the typical household 115Vac to a 24V thermostat ac control voltage, and a switch, the thermostat elements connected to the junction of an ac to dc converter, a digital control circuit and a TRIAC. The dc output is connected to a dc voltage regulator which outputs Vcc for a digital control circuit. The gate of the TRIAC is connected to the output of the digital control circuit, and operates in response thereto for selectively triggering the TRIAC for passing the 24Vac transformer control power to a solenoid operated gas valve. The solenoid gas valve is connected between the gas source and the gas burner to control the gas supply to the burner in response to the digital control circuit signal operation of the TRIAC; first on to heat the furnace heat exchanger to an operating temperature, and thereafter off and on for selected periods necessary to maintain the operating temperature of the heat exchanger while conserving gas. The control circuit includes a square wave generator for converting the thermostat 60 Hz 24Vac to square waves for a counter/divider. The counter/divider generates pulses suitable for counters of a dual binary counter counting the pulses for outputting selected timing control signals to a logic circuit (plurality of NOR gates). The logic circuit outputs high/low state signals to a TRIAC driver (opto-coupler) which drives the TRIAC in response to the high/low state output of the logic circuit for controlled operation of the gas furnace.

10 Claims, 3 Drawing Sheets

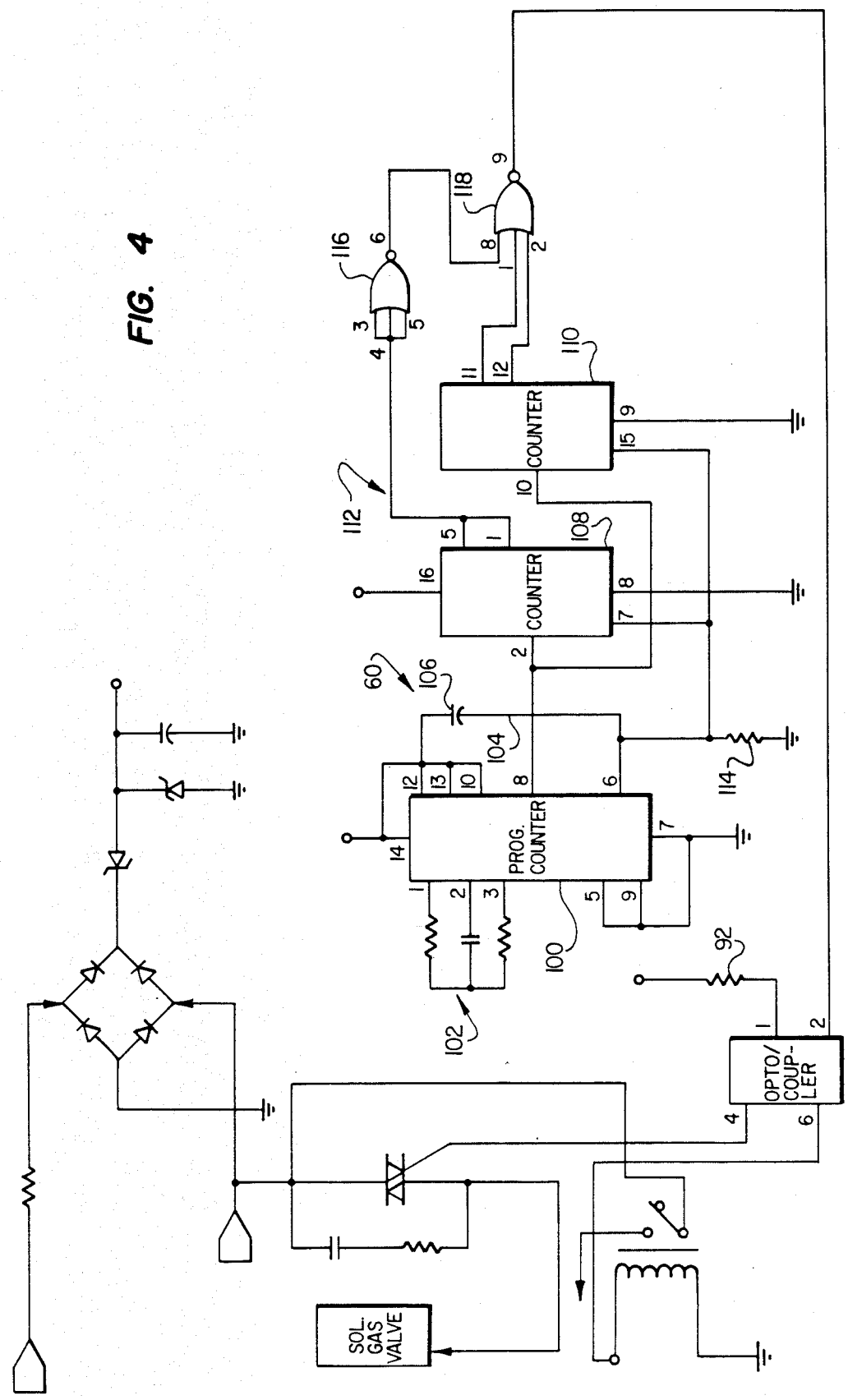

APPARATUS FOR CONTROLLING DEVICE START UP AND OFF/ON RUNNING PERIODS

This invention relates to control devices and more particularly to a digitally controlled electronic device for controlling gas consumption in a gas furnace.

BACKGROUND OF THE INVENTION

In the past commercial, industrial, or residential forced-air gas pilot ignition furnaces having 24Vac control circuits have burned gas continuously during the heating portion of the operating cycle. A typical heating cycle begins when the temperature of the unit, such as a house, for example, falls below the set temperature of a thermostat. At this point the thermostat sends a signal to the furnace to turn on the gas burner. The gas burner burns continuously to heat up the heat exchanger of the furnace. Then the blower fan turns on to draw cold air from the house through the heat exchanger to be heated and returned to the house. This heating process continues until the temperature of the house rises above the set temperature of the thermostat. At this point, the thermostat sends a signal to the furnace to turn off the gas burner.

During the heating cycle, the burner is continuously burning the gas. Thus, the heat exchanger is continuously heated right up to the turn off point. The temperature of the heat exchanger thus rises above the point that the cold air being drawn through the heat exchanger can maintain the temperature of the heat exchanger at an efficient operating level. When this happens, the excess heat is vented out via a chimney and wasted. Applicant has discovered that up to about 30 percent of the gas burning during the furnace on time is wasted.

Known efforts to overcome the above described furnace heat exchanger overheating problem and conserve gas has resulted in the development of a pulsed type fuel injection system. The pulsed fuel injection system pulses a gas/air mixture into a combustion chamber for ignition by a spark plug.

Although the efficiency level of the pulsed fuel injection system is about 93 to 95 percent compared to about 70 percent for the typical gas furnace, several disadvantages attend the use of the pulsed fuel injection system. For example, the combustion products include water containing acid and toxic materials which must be disposed of in compliance with environmental protection regulations. The explosion of the combustion mixture produces noises emitted by the furnace at an objectionable level. Also, the cost of the furnace as compared to the typical furnace is increased substantially, thus requiring at least a five to eight year payback period.

Another known system developed to overcome the problem of the typical gas furnace is the electronic ignition furnace. The electronic ignition furnace is a pilotless furnace with an efficiency level of about 80 percent. Like the pulsed fuel injection furnace, the electronic ignition furnace is very expensive as compared to the typical furnace. Also, the original furnace must be removed as in the pulsed fuel injection furnace.

Another known system used to control energy is the set-back thermostat. The set-back thermostat includes a built in clock. The temperature is automatically lowered at various times such as when there is no one there or at night. The problem with this system is that the only way to lower fuel costs is to lower the temperature. Also they are battery operated, and all programming is erased if power is absent for 48 hours or longer. The set-back thermostat has a payback period of about one winter season.

One major advantage of the present gas burner furnace cotnrol invention is the increased efficiency in gas consumption. Other advantages of the invention stem from the fact that the gas burner furnace control device is an add-on device which is inexpensive, easy to install and utilizes the electrical power supply of the furnace for operation. The use of the furnace power supply eliminates the need for a battery-type power supply, typically required for electronic circuits using Vcc. The device can also be used together with the set-back thermostat to provide maximum gas furnace operation economy.

SUMMARY OF THE INVENTION

Accordingly, it is an object of the invention to provide a gas burner control unit which is inexpensive to manufacture, easy to install on existing forced air gas pilot ignition furnaces, and which utilizes the electrical power supply of the furnace for operation.

Another object of the invention is to provide a heating control device for connection to a gas furnace to reduce the amount of gas consumption while maintaining the heating efficiency thereby providing the same heating capability while reducing substantially the heating cost.

Briefly, the invention comprises a heat control device connected between a thermostat and a solenoid operated gas valve of a forced air gas furnace. When the thermostat calls for heat, the control device becomes active to time a switch on period for the solenoid operated gas valve to pass gas from a source thereof to a gas burner of the furnace. A pilot gas burner ignites the gas and the burner burns the gas continuously during this period for raising the temperature of a furnace heat exchanger to a preselected operating temperature. Thereafter, the heat control device times the on/off periods of the solenoid operated gas valve for controlling the on and off periods of the gas burner for maintaining substantially the preselected operating temperature of the heat exchanger while air is passed therethrough by an air blower. When the temperature rises above the thermostat temperature set point, the thermostat turns off the heat control device and the gas burning operation ceases. Nevertheless, a bypass circuit is provided to bypass the heat control device to maintain the memory and to charge the battery of a memory type thermostat.

BRIEF DESCRIPTION OF THE DRAWINGS

Other advantages and objects of the invention will become more readily understood from the following detailed description and appended claims when read in conjunction with the drawings in which:

FIG. 4 is a schematic diagram of a second embodiment of the gas control device invention.

DETAILED DESCRIPTION OF THE INVENTION

Figure 1:
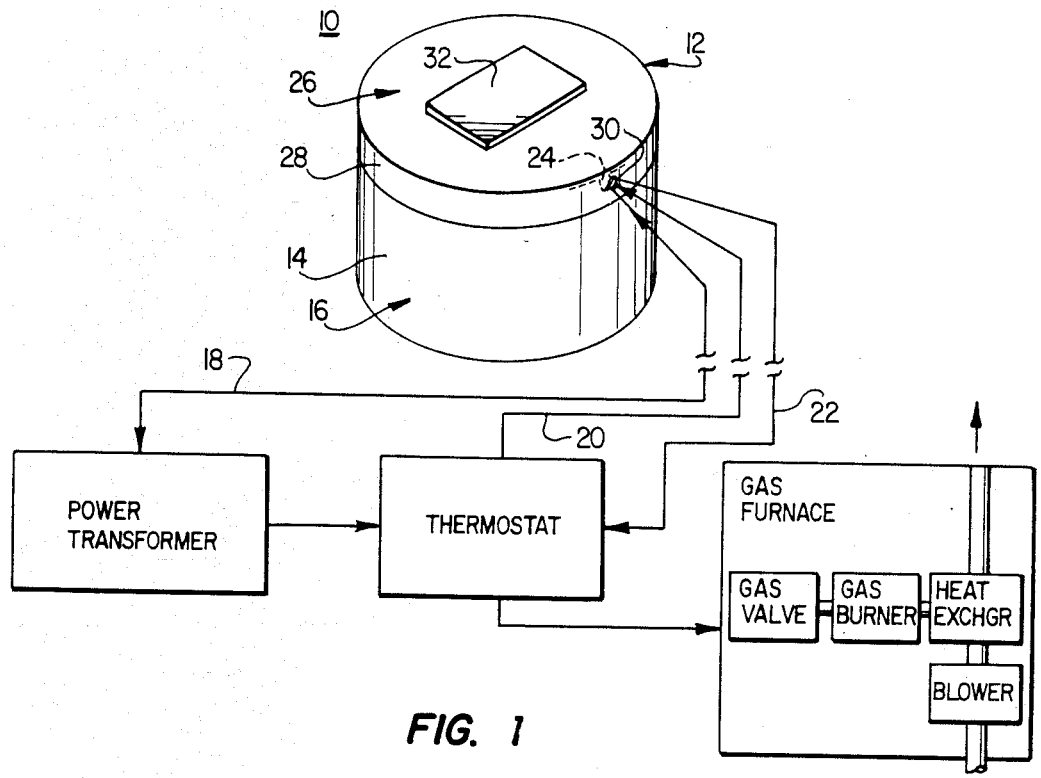
FIG. 1 is an isometric view of the gas control device constituting the subject matter of this invention.

The gas furnace gas control device 10 (FIG. 1) includes a housing 12. The housing 12 includes a cylindrically shaped bottom portion 14 containing a body of encapsulating material 16 in which is embedded the gas control device printed circuit board. Electrical leads 18, 20, and 22 of the printed circuit board, hereinafter described in detail, extend from the top surface of the encapsulating material outwardly to a groove 24 provided therefor in the cylindrically shaped bottom portion 14. The groove 24 is formed adjacent to the top surface of the bottom portion 14. A cylindrically shaped lid portion 26 has a depending flange portion 28 adapted to sealingly engage corresponding upper portions of the bottom portion 14. The flange portion 28 has walls forming an aperture 30 through which the electrical leads 18, 20, and 22 are passed prior to securing the lid portion 26 to the bottom portion 14 with the groove 24 aligned with the aperture 30. A fastener means 32 is attached to the lid portion 26, for securing the housing 12 to the furnace.

Lead 18 is connected to the common lead of a 24Vac transformer 34 which supplies 24Vac power to a cooling control and a fan control, for example, in addition to a thermostat 42. Lead 20 is connected to the thermostat. Lead 20 connects the 24Vac to either a control circuit 60 (FIG. 2) during operation of the gas control device or to the thermostat (FIG. 2) to charge the thermostat battery and provide voltage for memory operation during the inoperative state of the gas control device if the thermostat is a memory type thermostat.

The housing 12 may be fabricated using a thermosetting plastic. The lid portion of the plastic housing is secured to the bottom portion of the plastic housing using, for example, an epoxy. A suitable encapsulating material is, for example, a thermosetting plastic. The thermosetting plastic material fills the groove 24. The fastener 32 may be, for example, a double faced tape having a protective cover which is removed for sticking the housing to the furnace. It will be appreciated that the fastener, if desired, may be a typical screw or nut bolt type fastener.

Figure 2:
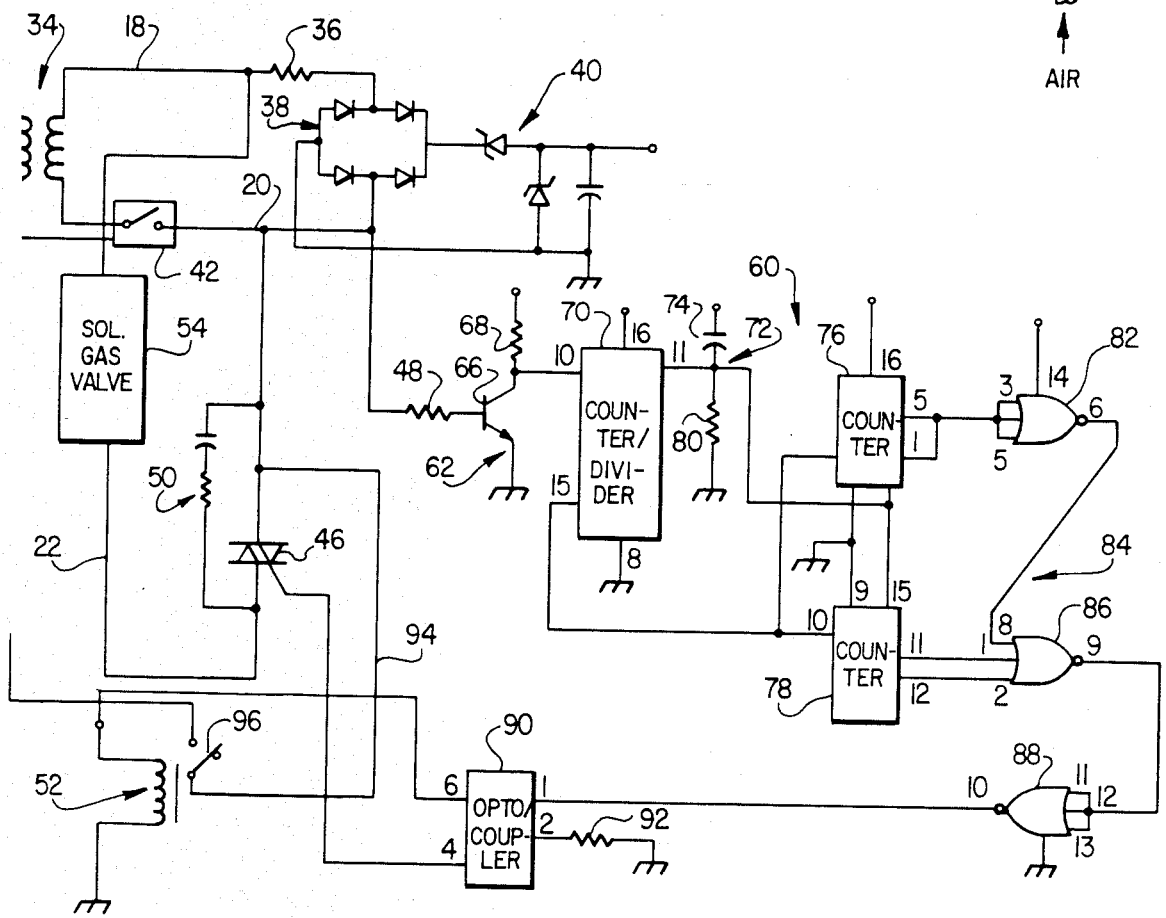
FIG. 2 is a schematic of the gas control device invention.

Referring now to FIG. 2, the schematic diagram of the digital gas control device includes the lead 18 connected to the common terminal of the 24Vac transformer 34. The transformer 34 is connected to the typical 115Vac house power source for producing the 24Vac required for the thermostat controls. The transformer supplies the 24Vac through a limiting resistor 36 to a full wave rectifier 38. The output of the rectifier 38 is connected to a dc voltage control circuit 40 for outputting a stable dc voltage Vcc at a preselected level (5.6 Vdc) for the digital components, hereinafter described.

Lead 20 is connected to the thermostat 42 and provides 24Vac to the junction of rectifier 38, TRIAC 46, a bias resistor 48 of the load control circuit 60 and bypass switch 52. An RC circuit 50 is connected across the TRIAC 46 to compensate for the instability of the TRIAC operation at or near the zero crossing of the ac power. This circuit is referred to as a snubber circuit at common parlance.

Lead 22 connects the output of the TRIAC 46 to the solenoid operated gas valve as the load 54. Relay switch 52 includes a relay coil connected between the output of pin 6 of an opto-coupler 90 and ground. Thus, the switch 52 closes and opens responsive to the high and low voltage outputs on pin 6 of the opto-coupler 90. Switch 52 closes when a high voltage is received from pin 6 to bypass the TRIAC 46 and supply power to the memory type thermostat 42 to recharge its memory supporting battery and to provide voltage necessary to maintain its memory operation. The switch 52 opens when the output of pin 6 goes low to permit the 24Vac passing through the TRIAC to operate the load 54. The load is the coil of the solenoid operated gas valve of the furnace.

The lead 20 also supplies the 24Vac to the timing or control circuit 60. The timing circuit includes a square wave generator 62. The square wave generator includes the bias resistor 48 having one end connected to lead 20 and a second end connected to the base of an NPN transistor 66. The transistor 66 has its emitter connected to ground and its collector connected to the junction of load resistor 68 and phase terminal 10 of a counter/divider 70. The transistor 66 clips the peaks off the 60 Hz power to provide a 60 Hz square wave to the counter/divider 70. The counter/divider 70 is, for example, a standard CD 4440 counter/divider.

The counter/divider 70 at the beginning is in the low state (FIG. 3) and has its reset terminal 11 (FIG. 2) connected to an RC timer 72. The RC timer has a capacitor 74 having one plate connected to Vcc and its other plate connected to the junction of the reset terminals of the counter/divider 70, ½ counters 76 and 78 of a dual binary counter, and resistor 80. The resistor 80 is connected to ground. The values of the timer 72 elements are such as to provide an initial start up time for operation of the furnace. A suitable start up time is about one to four minutes; however, this may be varied by using a variable resistor. The dual binary counter is, for example, a standard CD 4520 dual counter.

Figures 3, 5:
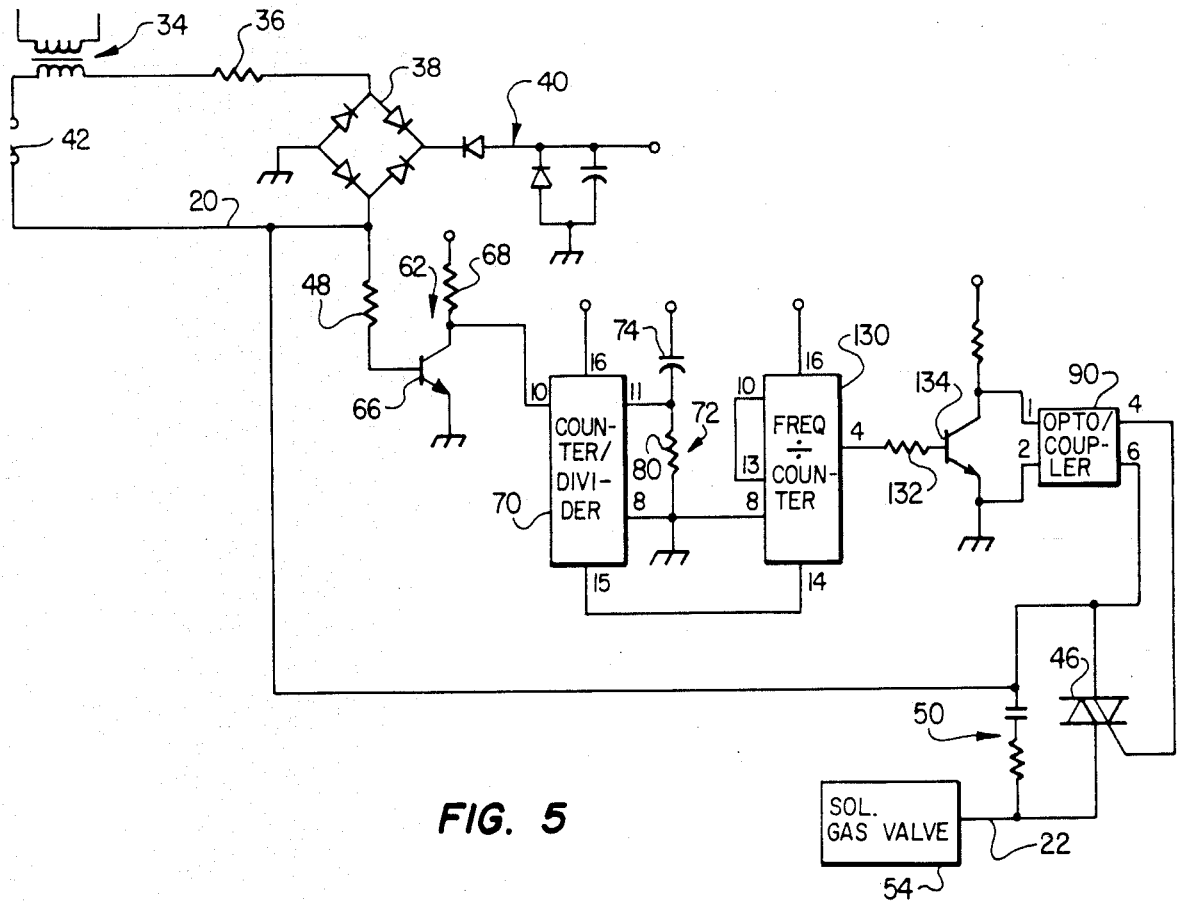
FIG. 3 is a timing diagram for the operation of the gas control device invention.
FIG. 5 is a schematic diagram of a third embodiment of the invention.

When the timer capacitor is charged the counter/divider 70 and the ½ counter 76 of the dual binary counter are reset to high or active states (FIG. 3). The counter 78 remains in a low state for ½ cycle. The counter/divider 70 (FIG. 2) divides the 60 Hz square wave by two to the eleventh power and outputs timing pulses through terminal 15 to the 2 and 10 terminals, respectively, of the ½ counters 76 and 78 of the dual binary counter. The ½ counter 76 counts the high and low states for a 34 second (17 second high and 17 second low) count to provide at pins 1 and 5 (FIG. 3) a high low state signal to a first NOR gate 82 of a triple NOR gate 84. Thus, the ½ counter 76 provides at pins 1 and 5 the initial low state signals necessary to turn on the gas burner during start up and then goes high and stays high until the thermostat turns off the furnace. While, the second ½ counter 78 of the dual binary counter after ½ cycle counts the high and low state pulses to provide the 34 seconds off and 102 seconds on (high) state signals at pins 11 and 12 to a second NOR gate 86 of the triple NOR gate 84. The output of NOR gate 82 is connected to an input terminal of NOR gate 86. The output of NOR gate 86 is connected to the input terminals of a third NOR gate 88 of triple NOR gate 84. The output terminal of the third NOR gate 88 is connected to the 1 terminal (positive side of an IR LED) of an opto-coupler 90. The triple NOR gate is, for example, a typical CD 4025 NOR gate, and the opto-coupler is a typical MOC 3031 coupler. Terminal 2 (negative side of the IR LED) of the opto-coupler is connected through resistor 92 to ground. The high state output terminal 4 of the opto-coupler 90 is connected to the gate of the TRIAC 46 to fire the TRIAC to pass the 24Vac to the load 54. The low state terminal 6 of the opto-coupler is connected to the coil of switch 52 as previously described.

Thus, in operation the timers counter/divider 70 and the ½ counters 76 and 78 are in the off (low) state (FIG. 3), and the triple NOR gate output a high state signal to the opto-coupler. The opto-coupler outputs a high state signal to fire the TRIAC 46 for activating the gas valve to turn on the furnace. After the initial start up time, the timer resets the counter/divider 70 and the ½ counter 76 to the high state. The ½ counter 78 remains low for one half cycle before going to a high state. Thus, the triple NOR gates output a low state to the opto-coupler to turn off the firing signal to the gate of the TRIAC and turn off the gas for 34 seconds. At the end of the 34 seconds the ½ counter 78 switches to the high state to trigger the gate of the TRIAC to turn on the gas burner for 102 seconds to complete the heating cycle. After the first cycle, the cycle repeats to turn the gas burner off for 34 seconds and on for 102 seconds until the thermostat signals a rise in temperature above the thermostat's temperature set point.

Referring now to FIG. 4, a second embodiment of the gas control device, except for the timer 60 is identical to the first embodiment shown schematically in FIG. 2. The timer 60, of the second embodiment, includes a programmable counter 100 having an RC circuit 102 connected to pins 1, 2, and 3. The RC circuit provides the clock pulses to the programmable timer. The Vcc is connected to pins 14, 12, 13, and 10 of the programmable timer and to an RC timing circuit 104. The RC timing circuit includes a capacitor 106 having a first plate connected to Vcc and a second plate connected to the junction of memory reset pin 6 of the programmable timer, reset pins 7 and 15 of the ½ counters 108 and 110 of a CD4520 dual counter 112 and resistor 114. Resistor 114 is connected to ground. The enable pin 8 of the programmable counter is connected to the enable pins 2 and 10 of the ½ counters 108 and 110.

The output pins 1 and 5 of the ½ counter 108 are connected together and to the input terminals of a first NOR gate 116; while, the output pins 11 and 12 of the ½ counter 110 are connected to input terminals 1 and 2 of a second NOR gate 118. The output of the first NOR gate is connected to input pin 8 of the second NOR gate. The first and second NOR gates may be, for example, the first and second NOR gates of a standard CD4025 triple NOR gate. The timing of the timer 60 is that disclosed in FIG. 4. Thus, it will be appreciated that by using only two of the three NOR gates, the output of the second NOR gate is of opposite (low) state; thus, the output of the second NOR gate is connected to the 2 pin (minus side of the LED) of the opto-coupler 90 and pin 1 is connected through the resistor 92 to ground. The labeling of output pin 4 and pin 6 are now reversed, and as reversed pin 4 is connected to the gate of the TRIAC and pin 6 is connected to the coil of the relay switch 52 as described in conjunction with the first embodiment.

Referring now to FIG. 5, for a description of a third embodiment of the invention. The third embodiment is substantially that of the first embodiment; thus, identical reference numbers will be used to designate the repeated elements of the first embodiment with new reference numbers being applied to the new elements.

The thermostat 42 has its 115Vac to 24Vac transformer connected through the limiter resistor 36 to a first ac terminal of the full wave rectifier 38. The switch of thermostat 42 is connected between the transformer 34 and a second ac terminal of the full wave rectifier 38, TRIAC 46 and resistor 48. The full wave rectifier 38 output is connected to the dc voltage regulator 40 for producing a stable Vcc for the digital components.

The bias resistor 48 is connected to the transistor 66 which acts as a square wave generator for the 60 Hz ac input for the counter/divider 70. The counter divider 70 is connected to the timer circuit 72 for outputting clock timing pulses to decade counter divider 130, which may be, for example, a typical CD4017 decode counter/divider with decoded outputs connected through a bias resistor 132 to a transistor switch 134. The opto-coupler 90 is connected to the output of the transistor for outputting, as a driver, timed trigger pulses to the TRIAC 46. The RC circuit 50 is connected across the TRIAC 46 as the snubbing circuit.

The TRIAC 46 is triggered by the driver timing pulses of the opto-coupler to connect the thermostat control Vac to the load 54. Load 54 is the solenoid of the solenoid operated gas valve. Thus, pursuant to the control circuit the gas valve is turned on to supply gas to a gas burner first continuously for a period to heat the heat exchanger to an operating temperature, and thereafter alternately off and on for preselected time periods for conserving gas during the off time period and maintaining the operating temperature of the heat exchanger during the on time period.

Although several embodiments of the invention have been shown and described, it will be appreciated by those persons skilled in the art that other modifications and changes may be made without departing from the scope of the invention.

What is claimed is:

1. A control device for a system such as a forced air gas burning central heating system or the like comprising:
   a. power means for producing ac voltage for operation of the system and converting ac power to dc power for a control means;
   b. gate controlled semiconductor switch means connected to the power means for controlling the connection of ac power to a load; and
   c. control means connected to the power means for receiving the dc power, and to the gate controlled semiconductor switch for controlling the operation of the switch means in response to the dc power, said control means including first timing means for producing an initial timing signal for the gate controlled semiconductor switch means to conduct ac power for a first preselected time, and a second timing means for producing alternately first and second timing signals for the gate controlled semiconductor switch after the initial signal to block the flow of ac power to the system for a preselected time, and to conduct ac power to the system for a preselected time, wherein the control means further includes a square wave generator connected to the ac power source for producing a plurality of square wave signals at the frequency of the ac source of power, a frequency divider connected to the square wave generator for producing square wave signals having a preselected frequency, the first timing means connected to the frequency divider for generating the initial timing signal for said first preselected time, and the second timing means includes a frequency counter means connected to the frequency divider for thereafter alternately generating said first timing signals for said preselected time periods and said second timing signals for said preselected time periods for the gate controlled semiconductor switch means.

2. A gas control device according to claim 1 further including a driver means connected to the frequency counter means and to the gate-controlled semiconductor switch means for driving the gate controlled semiconductor switch means responsive to the outputs of the frequency counter means.

3. A gas control device according to claim 2 wherein the frequency counter means includes a plurality of counters connected to the frequency divider for selectively producing a plurality of timing signals, and logic circuitry connected to the plurality of counters for producing responsively to the plurality of timing signals, high/low state signals and wherein the gate-controlled semiconductor switch means driver is connected to the logic means for outputting driver signals corresponding to the selected high/low state signals of the logic means.

4. A gas control device according to claim 3 wherein the logic means is a plurality of NOR gates.

5. A gas control device according to claim 4 wherein the gate controlled semiconductor switch means driver is an opto-coupler.

6. A control device for a system such as a forced air gas burning central heating system or the like comprising:
   a. power means for producing ac voltage for operation of the system and converting ac power to dc power for a control means;
   b. gate-controlled semiconductor switch means connected to the power means for controlling the connection of ac power to a first load;
   c. control means connected to the power means for receiving the dc power, and to the gate-controlled semiconductor switch for controlling the operation thereof in response to the dc power, said control means including first timing means for producing an initial timing signal for the gate-controlled semiconductor switch means to conduct ac power for a first preselected time, and a second timing means for producing alternately first and second timing signals for the gate-controlled semiconductor switch after the initial signal to block the flow of ac power to the system for a preselected time, and to conduct ac power to the system for a preselected time; and
   d. an ac bypass means for a second load requiring ac, said ac bypass means including a solenoid operated switch having a solenoid selectively connected to a dc output of the control means, and a switch connected between the ac power source and said second load for bypassing the gate controlled semiconductor switch means in response to the dc output of the control means being turned off to the gate controlled semiconductor switch means and on to the solenoid.

7. A gas control device according to claim 6 wherein the ac bypass means includes a relay having a coil selectively connected to the dc power output of the control means and a switch in operative association with the coil and connected between the second ac load and the ac output terminal.

8. Apparatus for controlling a start up period and constant off and constant on periods for a running time of a device comprising:
   a. a switching means for connection to an ac power source; and
   b. a timing means for connection to the ac power source and switching means, first for producing a timing signal for start up; and, secondly, for producing constant off and constant on timing signals for running the device during a running period, said timing means including a square wave generating means for generating square waves corresponding to the frequency of the ac source, a counter/divider means for dividing the square waves into a plurality of timing pulses, a timer connected to the counter/divider for generating timing signals for timing the start up period; first and second counter means connected to the timing means and counter/divider, said first counter being activated and said second counter being deactivated in response to the timer and counter/divider wherein said first counter means turns on the switching means during an initial start up period, and thereafter the second counter means is activated and the first counter means is deactivated wherein the second counter means is operative to alternatively turn the switching means off for constant off periods and on for constant on periods during a running period.

9. An apparatus for maintaining a start up period and off/on running periods for a device comprising:
   a. an ac power source means for supplying ac power;
   b. a switching means connected to the ac power source means for switching ac power on and off for device operation;
   c. a square wave generating means connected to the ac power source for producing a plurality of square wave signals at the frequency of the ac source of power;
   d. a frequency dividing means connected to the square wave generating means for producing square wave signals having a preselected frequency;
   e. a timing means connected to the frequency divider for generating an initial timing signal for the switching means wherein ac power is passed for the start up period of the device; and
   f. a frequency counter means connected to the frequency divider for alternately generating off/on timing signals of preselected durations for the switching means after start up wherein ac power is alternately blocked and passed to the device for off/on running periods beginning after start up.

10. A control device for regulating the combustion of gas in a central heating system powered by an ac power source operating through a switch, comprising:
   square-wave generator means connected to the ac power source for producing a plurality of square wave signals at the frequency of the ac source of power;
   frequency counter/divider means for driving the power frequency into suitable clocking pulses for determining preselected timing signals;
   decode counter/divider means connected to the frequency counter/divider for outputting a plurality of time period indicating signals; and
   transistor means connected to the decode counter/divider for outputting timing signals to the switch, first to conduct ac power for a preselected time, and thereafter, alternately to block the working ac power for a first preselected time, and to conduct ac power for a second preselected time.

* * * * *

UNITED STATES PATENT AND TRADEMARK OFFICE
CERTIFICATE OF CORRECTION

PATENT NO. : 4,798,971

DATED : January 17, 1989

INVENTOR(S) : Charles T. Gravely

It is certified that error appears in the above-identified patent and that said Letters Patent is hereby corrected as shown below:

Column 2, line 6, "cotnrol" should be --control--.

Column 3, line 30, "(FIG. 2)" should be --(FIG. 1)--.

Signed and Sealed this

Eighteenth Day of July, 1989

*Attest:*

DONALD J. QUIGG

*Attesting Officer*  *Commissioner of Patents and Trademarks*